United States Patent [19]
Lopez et al.

[11] Patent Number: 5,277,957
[45] Date of Patent: Jan. 11, 1994

[54] FILM REINFORCED WITH YARN COATED WITH HOT MELT ADHESIVE

[75] Inventors: Eugene F. Lopez, Sunnyvale; Hemang Shah, Fremont, both of Calif.

[73] Assignee: Orcon Corporation, Union City, Calif.

[21] Appl. No.: 756,491

[22] Filed: Sep. 9, 1991

[51] Int. Cl.$^5$ .............................................. B32B 5/12
[52] U.S. Cl. .................................... 428/109; 428/105; 428/198; 428/284; 428/285; 428/294
[58] Field of Search ............... 428/105, 109, 110, 294, 428/232, 285, 343, 346, 354, 355, 107, 108, 198

[56] References Cited

U.S. PATENT DOCUMENTS

| | | | |
|---|---|---|---|
| 2,691,614 | 10/1954 | Wilson | 154/139 |
| 3,222,237 | 12/1965 | McKelvy | 428/110 |
| 3,337,381 | 8/1967 | Kuhn | 156/93 |
| 3,391,039 | 7/1968 | Bascom et al. | 156/171 |
| 3,391,043 | 7/1968 | Bascom | 156/181 |
| 3,463,693 | 8/1969 | Bascom et al. | 156/361 |
| 3,479,811 | 11/1969 | Walters | 57/153 |
| 3,496,053 | 2/1970 | Bascom et al. | 161/57 |
| 3,565,741 | 2/1971 | Jaray | 161/60 |
| 3,573,137 | 3/1971 | Bascom et al. | 156/428 |
| 3,582,443 | 6/1971 | Bascom | 161/57 |
| 3,616,130 | 10/1971 | Rogosch | 428/110 |
| 3,669,790 | 6/1972 | Bascom et al. | 156/162 |
| 3,972,768 | 8/1976 | Hill | 428/346 |
| 4,087,577 | 5/1978 | Hendrickson | 428/110 |
| 4,107,363 | 8/1978 | Dawn et al. | 428/109 |
| 4,136,069 | 1/1979 | Vachon et al. | 260/23 |
| 4,147,580 | 4/1979 | Buell | 156/291 |
| 4,295,905 | 10/1981 | Bascom et al. | 156/174 |
| 4,360,555 | 11/1982 | Bascom et al. | 428/107 |
| 4,372,801 | 2/1983 | Bascom et al. | 156/434 |
| 4,401,782 | 8/1983 | Conklin et al. | 524/313 |
| 4,444,822 | 4/1984 | Doyle et al. | 428/109 |
| 4,503,108 | 3/1985 | Clausen et al. | 428/108 |
| 4,774,135 | 9/1988 | Bryant | 428/392 |

FOREIGN PATENT DOCUMENTS 1010017  5/1977  Canada .

*Primary Examiner*—James J. Bell
*Attorney, Agent, or Firm*—Haverstock, Medlen & Carroll

[57] ABSTRACT

The invention provides a reinforced film or reinforced metallized film, in which the reinforcing yarns in the fill and/or warp direction are coated with hot melt adhesive and placed in contact with the reinforced film, under heat and pressure, to melt the hot melt adhesive and bond the coated yarns to the film.

17 Claims, 1 Drawing Sheet

FILM REINFORCED WITH YARN COATED WITH HOT MELT ADHESIVE

TECHNICAL FIELD OF THE INVENTION

This invention relates generally to reinforced plastic films. In particular, the present invention relates to plastic films which use reinforcing fibers which are attached with hot melt adhesives.

BACKGROUND OF THE INVENTION

Thin, flexible plastic films, such as Polypropylene, polyethylene, polyvinyl chloride, Tedlar ® (a registered trademark of E.I. DuPont De Nemours & Co. for polyvinyl fluoride films), Mylar ® (a registered trademark of E.I. DuPont De Nemours & Co. for polyester films), and similar impermeable, nonporous plastic films, have been found to be particularly useful as moisture, vapor and thermal barriers for a variety of products such as aircraft insulation blankets. These properties, especially thermal reflectance and decreased moisture transmission through the film, can be improved by providing a thin, reflective metallized layer, typically on one side of the plastic film.

Such films, however, require reinforcement to enable them to withstand manufacturing and subsequent use. Reinforcement is generally provided by bonding reinforcing fibers to the film.

One way of providing a reinforced film is to cast the molten film plastic onto a scrim or reinforcing fibers so that the reinforcing fibers are carried within the film itself. This method is disadvantageous, however, since it requires the manufacturer to acquire the equipment needed for casting and forming the various flexible plastic films and for metallizing if practical.

Another way of providing reinforced film is to select the desired pre-formed film or metallized film, and reinforce the film by adhesively bonding the reinforcing fibers or yarns to at least one side of the film.

Petroleum and organic based solvent adhesives have been widely used in the past to bond such reinforcing fibers to the film because of the speed of cure which is possible with such adhesives. However, the use of petroleum and organic based solvent adhesives is declining due to stricter air quality control laws. Further, solvent based adhesives may corrode aluminum, thus limiting the use of such reinforced films in aviation or in other environments in which aluminum is used. Thus, the need exists for a reinforced film in which the reinforcing yarns can be attached to the film using an adhesive which is non-corrosive and which produces low or no solvent emissions during cure.

SUMMARY OF THE INVENTION

The present invention provides a reinforced metallized or nonmetallized film in which the reinforcing yarns are attached using hot melt adhesives.

In one embodiment, the present invention provides a method for reinforcing a film with reinforcing fibers coated with hot-melt adhesive, in which the yarns are placed in contact with the surface of the film and heat is applied to attach the yarns to the surface of the film.

In another embodiment, the present invention provides a film reinforced using hot melt coated yarns.

BRIEF DESCRIPTION OF THE DRAWINGS:

A better understanding of the invention and its advantages will be apparent from the detailed description taken in conjunction with the accompanying drawings in which.

DETAILED DESCRIPTION OF THE INVENTION

Figure 1:
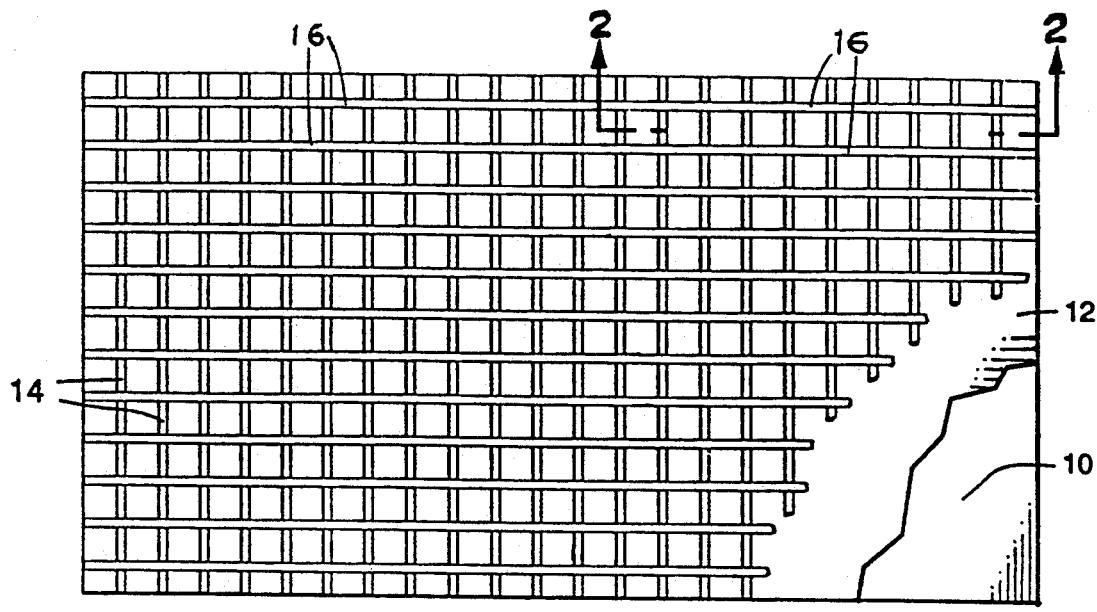
FIG. 1 is a top view of a reinforced film of the present invention.
Figure 2:
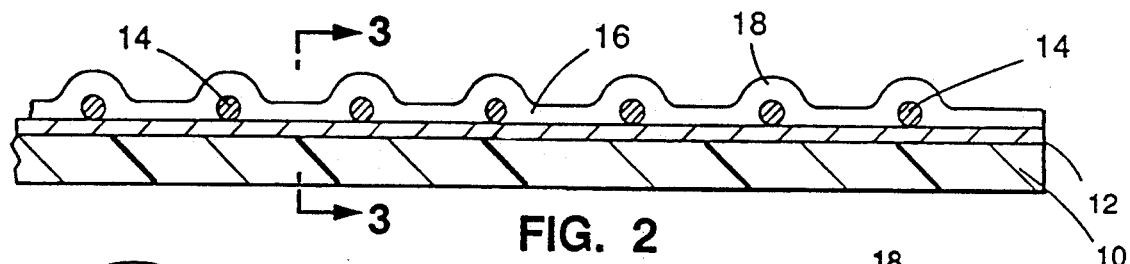
FIG. 2 is a cross sectional view of a reinforced film of the present invention taken through line 2—2 of FIG. 1.
Figure 3:
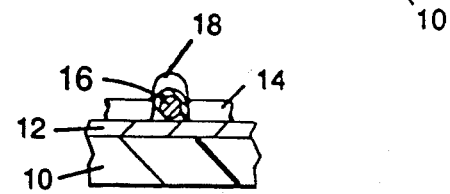
FIG. 3 is a cross-sectional view of a reinforced film of the present invention taken through line 3—3 of FIG. 2; and, FIG. 4 is a simplified perspective diagram showing the bonding of reinforcing yarns to a film using hot nip rollers.

FIGS. 1 and 2 show a basic configuration of a reinforced film of the present invention. Film 10 can be constructed of any thin, flexible, plastic film such as, for example, polypropylene, polyethylene, polyvinyl chloride, Tedlar ®, Mylar ® or the like. If desired, film 10 can include a thin metallized layer 12.

Reinforcing fibers, preferably including both fill fibers 16 and warp fibers 14, are coated with a hot melt type adhesive and bonded to the film 10 or metallized layer 12 by the subsequent application of heat and pressure. Hot melt adhesives are particularly desirable, since they generally do not emit gasses which are harmful to air quality, as solvent-based adhesives do, and because they are non-corrosive to aluminum.

Such reinforcing fibers can be constructed from synthetic or natural yarns, including nylon and cotton, and are preferably multifilament yarns. If synthetic yarns are used, a hot melt adhesive 18 must be selected which has a melting point lower than a temperature which will degrade either the yarn or the film.

A typical method for coating yarns with hot melt adhesive is set forth in U.S. Pat. No. 4,774,135, the disclosure of which is incorporated herein by reference. For example, a 70 denier multifilament dacron thread can be coated with a polyamide hot melt adhesive such as Bostik 4252 to a thickness of about 0.0065 inches for use in reinforcing 0.2 to 0.5 mil plastic films.

Figure 4:
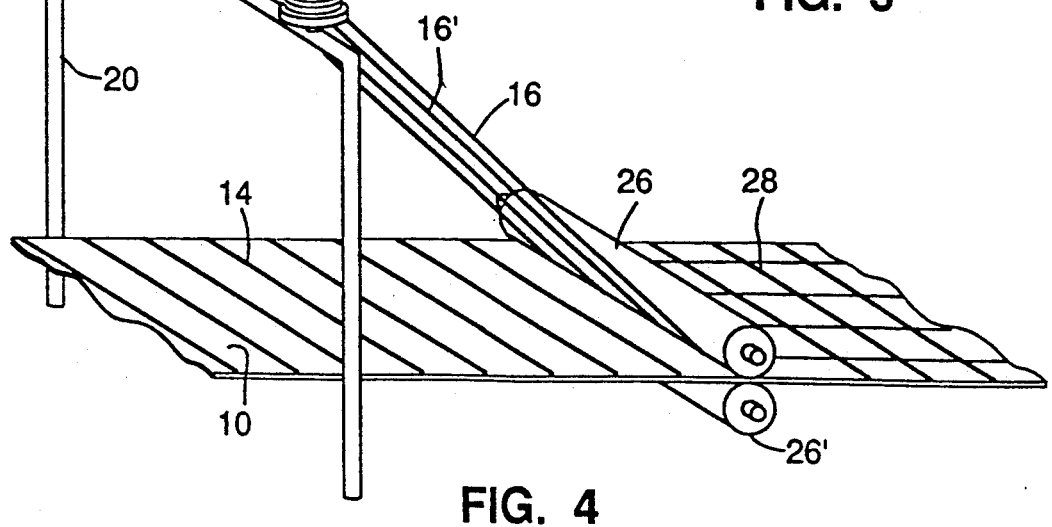

In the reinforced film shown in FIGS. 1 and 2, the warp yarns 14 are preferably placed on the film first, followed by overlying fill yarns 16. Preferably the fill yarns 16 are precoated with hot melt adhesive, then positioned on the surface of the film 10 or metallized film 12 over warp yarns 14 which were previously laid onto the film, and heat and pressure sufficient to melt the adhesive is applied to bond both the fill and warp yarns to the film, as shown in FIG. 4. This is done by drawing the desired number of hot melt coated fill yarns 16, 16' off spools 22, 22' which are spaced apart as desired along bracket 20. Bracket 20 preferably includes a device for maintaining the desired tension on the yarns 16, 16' as they pass from the spools 22, 22' to the film 10 on which the warp yarns 14, 14' have been laid. The yarns 16, 16', 14 and film pass between hot nip rollers 26, 26' which melt the hot melt adhesive 18 coating the yarns 16, 16' and press the coated yarns against the warp yarns 14, 14' and the film 10. As the reinforced film 28 passes out from between the hot nip rollers 26, 26', the hot melt adhesive 18 cools and hardens, bonding both the warp yarns 14 and the fill yarns 16 to the film surface. In some cases the reinforcing warp yarns 14 may also be coated with adhesive.

One skilled in the art will recognize that while the preferred embodiments have been described in detail, and shown in the accompanying drawings, one skilled in the art will recognize that various further modifications are possible without departing from the scope of the invention as set forth in the appended claims.

I claim:

1. A reinforced film comprising:
   a film substrate;
   a plurality of regularly spaced reinforcing yarns bonded to said film substrate with a hot melt adhesive; and wherein said film substrate is substantially free of hot melt adhesive everywhere except along said reinforcing yarns.

2. The film o claim 1 in which the reinforcing yarns include a plurality of yarns regularly spaced in a fill direction and a plurality of yarns regularly spaced in a warp direction.

3. The film of claim 2 in which said reinforcing yarns are bonded one side of the film substrate.

4. The film of claim 3 in which the film substrate additionally comprises a metallized layer bonded to one side of the film substrate.

5. The film of claim 4 in which the reinforcing yarns are bonded to the metallized layer.

6. The film of claim 1 in which the reinforcing yarns are multifilament, synthetic yarns.

7. The film of claim 2 in which the fill reinforcing yarns are laid over the warp reinforcing yarns.

8. The film of claim 7 in which the fill yarns are substantially uniformly coated with a preselected quantity of hot melt adhesive, the warp reinforcing yarns are not coated with adhesive, and the fill and warp yarns are bonded to the film by the hot melt adhesive coating the fill yarns.

9. A reinforced film comprising:
   a film substrate;
   a metallized layer bonded to one side of the film substrate;
   a plurality of regularly spaced reinforcing yarns bonded to one side of said film substrate in a fill direction and in a warp with a hot melt adhesive.

10. The film of claim 9 wherein said reinforcing yarns are bonded to the metallized layer.

11. The film of claim 9 wherein the reinforcing yarns are multifilament, synthetic yarns.

12. The film of claim 9 wherein the reinforcing yarns in the fill direction are laid over the reinforcing yarns in the warp direction.

13. The film of claim 12 wherein the reinforcing yarns in the fill direction are uniformly coated with said hot melt adhesive, the reinforcing yarns in the warp direction are not coated with hot melt adhesive, and the fill and warp yarns are bonded to each other and to the film by the hot melt adhesive uniformly coating the reinforcing yarns in the fill direction.

14. A reinforced film comprising:
    a film substrate;
    a metallized layer bonded to one side of the film substrate;
    a plurality of regularly spaced reinforcing yarns bonded to the metallized layer in a fill direction with a hot melt adhesive; and,
    a plurality of regularly spaced reinforcing yarns bonded to the metallized layer in a warp direction with a hot melt adhesive.

15. The reinforced film of claim 14 wherein said yarns are multifilament, synthetic yarns.

16. The reinforced film of claim 14 wherein said reinforcing yarns in the fill direction are laid over the reinforcing yarns in the warp direction.

17. The film of claim 16 wherein the reinforcing yarns in the fill direction are uniformly coated with said hot melt adhesive, the reinforcing yarns in the warp direction are not coated with hot melt adhesive, and the fill and warp yarns are bonded to each other and to the film by the hot melt adhesive uniformly coating the reinforcing yarns in the fill direction.

* * * * *

UNITED STATES PATENT AND TRADEMARK OFFICE
CERTIFICATE OF CORRECTION

PATENT NO. : 5,277,957
DATED      : 01/11/94
INVENTOR(S) : LOPEZ ET AL.

It is certified that error appears in the above-identified patent and that said Letters Patent is hereby corrected as shown below:

```
     In column 4, line 3, please insert "direction" after
--warp--.
```

Signed and Sealed this

Seventh Day of June, 1994

Attest:

BRUCE LEHMAN

*Attesting Officer*     *Commissioner of Patents and Trademarks*